(12) United States Patent
Montanari et al.

(10) Patent No.: US 8,252,892 B2
(45) Date of Patent: Aug. 28, 2012

(54) PROCESS FOR OBTAINING AN ELASTOMER IN SOLID PHASE STARTING FROM ITS POLYMER SOLUTION

(75) Inventors: Fabio Montanari, Ravenna (IT); Federica Mainardi, Barbiano Di Cotignola (IT); Gabriele Veneri, Ravenna (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 0 days.

(21) Appl. No.: 13/129,001

(22) PCT Filed: Nov. 5, 2009

(86) PCT No.: PCT/EP2009/008005
§ 371 (c)(1),
(2), (4) Date: Jul. 13, 2011

(87) PCT Pub. No.: WO2010/054788
PCT Pub. Date: May 20, 2010

(65) Prior Publication Data
US 2011/0269931 A1    Nov. 3, 2011

(30) Foreign Application Priority Data
Nov. 14, 2008 (IT) ............................. MI2008A2029

(51) Int. Cl.
*C08C 2/06* (2006.01)
*B01J 19/18* (2006.01)

(52) U.S. Cl. ..................... 528/500; 264/176.1; 264/219; 525/351; 525/370; 525/402; 528/503

(58) Field of Classification Search ............... 264/176.1, 264/219; 525/351, 370, 402; 528/500, 503
See application file for complete search history.

(56) References Cited

U.S. PATENT DOCUMENTS

| 4,158,653 | A | * | 6/1979 | Chung | 524/425 |
| 5,684,087 | A | * | 11/1997 | Wulff et al. | 525/63 |
| 7,585,917 | B2 | * | 9/2009 | Datta et al. | 525/191 |

FOREIGN PATENT DOCUMENTS

| DE | 195 37 113 | 3/1997 |
| GB | 1 230 542 | 5/1971 |

OTHER PUBLICATIONS

International Search Report issued Dec. 29, 2009 in PCT/EP09/008005 filed Nov. 5, 2009.

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

A process for obtaining an elastomer in solid phase from its polymer solution which comprises: (a) optionally pre-concentrating the polymer solution coming from the production system by a flash process; (b) subjecting the polymer solution to a concentrating stripping operation by water vapor in a mixing device comprising internal moveable mixing parts which transfer minimal mechanical energy to the solution in the form of friction heat; and (c) subjecting the concentrated polymer phase coming from (b) to devolatilization by mechanical energy and/or vapor flow to remove residual solvent.

19 Claims, 1 Drawing Sheet

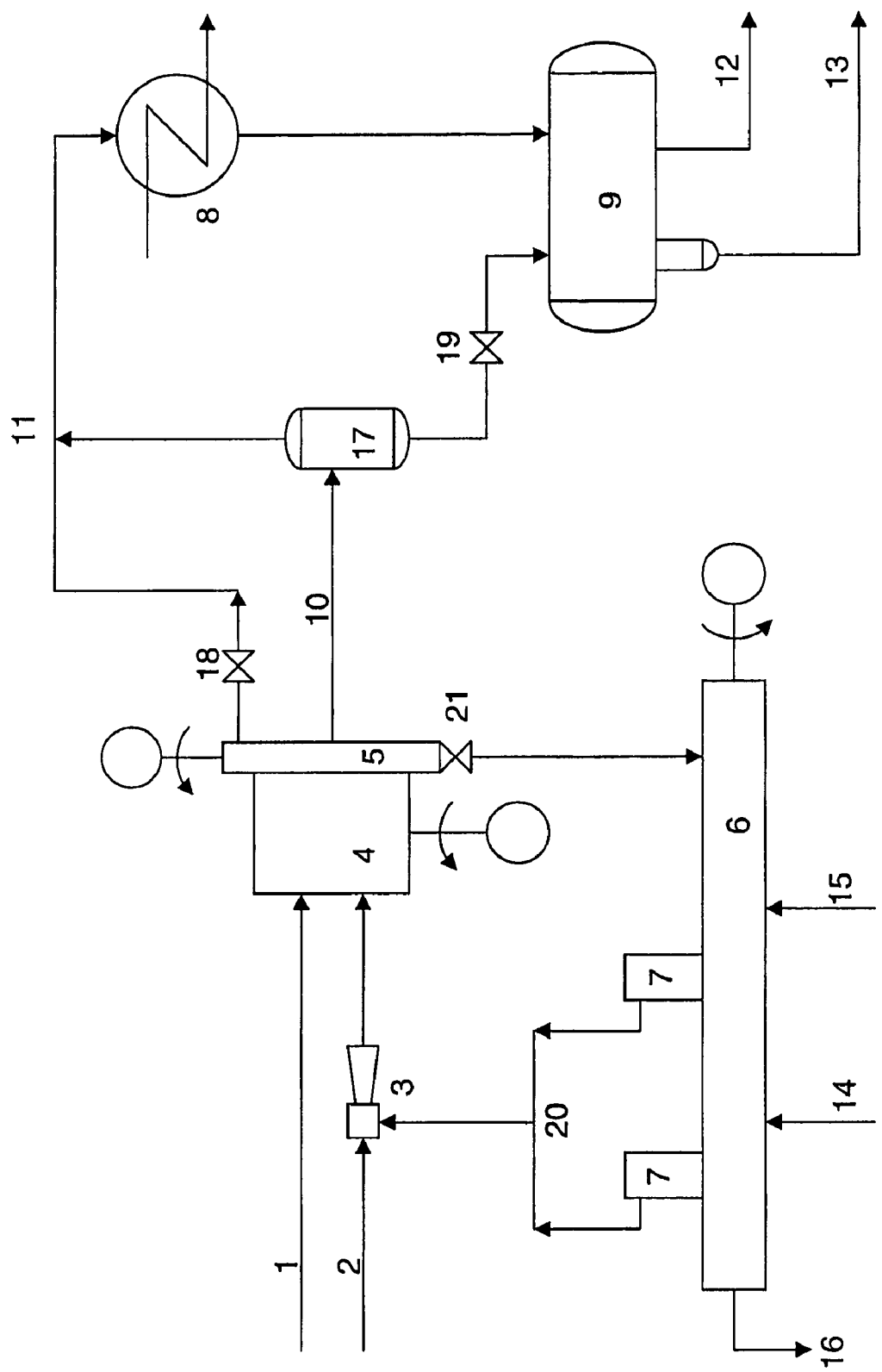

PROCESS FOR OBTAINING AN ELASTOMER IN SOLID PHASE STARTING FROM ITS POLYMER SOLUTION

The present invention relates to a process for obtaining an elastomer in solid phase starting from its polymer solution.

More specifically, the present invention relates to an innovative process for the removal of the solvent from the polymer solution of an elastomer (finishing), wherein the energy necessary for the evaporation of the solvent is supplied through the heat provided by the condensation of water vapour and, to a lesser extent, through the mechanical energy supplied to the polymer phase. The terms polymer and elastomer, as used in the present description and claims, are equivalent.

Even more specifically, the present invention relates to a process for obtaining an elastomer in solid phase starting from its polymer solution wherein the elastomer can be selected from polybutadiene, having an average molecular weight Mw ranging from 50,000 to 500,000, polyisoprene, having an average molecular weight Mw ranging from 60,000 to 350,000, Styrene(S)-Butadiene(B) elastomers, of the SB, SBS, SBSB type with a random, block or tapered distribution, having an average molecular weight Mw ranging from 50,000 to 250,000, and all the products cited in which the olefinic part has been completely or partially hydrogenated, whereas the solvent is a non-polar solvent such as pentane, cyclopentane, hexane, cyclo-hexane, etc.

An innovative element included in this process is the introduction of a new unitary operation, called "concentrated stripping", which envisages effecting the removal of the solvent according to procedures, described hereunder, operating on a polymer phase in the semi-solid state.

In particular, the optimized use of vapour allows the cost of the energy used in this process to be reduced, with respect to the known technologies.

As is known, the finishing of elastomers can be grouped into two types of process defined as "Traditional Technology" and "Direct Devolatilization".

The term "Traditional Technology" refers to a technology described, for example, in U.S. Pat. Nos 3,323,222, 3,462,347 and 4,278,506 whereas the term "Direct Devolatilization" refers to a technology which comprises the evaporation of the solvent contained in the polymer solution in specific machines which treat the polymer in continuous solid phase or in the form of granules, as described, for example, in U.S. Pat. Nos. 4,909,989, 5,283,021, 5,478,509 and 6,150,498 or in the U.S. patent application 2006/193,197.

The "Traditional Technology" envisages a first section (steam stripping) in which the polymer solution is fed to a water bath together with a stream of water vapour. Part of the water vapour condenses providing the heat necessary for the evaporation of the solvent. A suspension of polymer lumps in water is obtained, with a sufficiently low residual solvent content. A characteristic of this process is represented by the expedients adopted for avoiding the cohesion of the lumps, maintaining the suspension in a stable form which allows its pumpability.

The second section of the traditional process comprises the drying of the polymer lump (elimination of the water contained in the lump) obtained by means of mechanical removal (squeezing) followed by evaporation of the water. These two operations are generally effected in two separate extruders. The first extruder compresses the polymer lumps, allowing the discharge of the water in liquid phase, whereas the second extruder allows the evaporation of the residual water, as, by dissipation of the mechanical energy, it increases the temperature of the polymer phase allowing, in suitable degassing areas, the flash process of the water in the form of vapour.

In short, the "Traditional Technology" comprises a first step, in which the solvent is removed by evaporation through the use of water vapour, and a second step, in which said water is removed in both liquid phase, by squeezing, and in vapour phase, through the energy supplied by the dissipation of mechanical energy.

The traditional configuration therefore envisages feeding polymer solution and vapour to a water bath. The evaporation of the solvent however causes the formation of polymer lumps which still contain a certain amount of solvent. In traditional stripping, the polymer is therefore discharged in the form of slurry or lumps suspended in water.

In order to avoid blockages and obstructions of the stripper and discharge lines, it is fundamental to guarantee the correct dimension of the lumps to prevent them from agglomerating. A characteristic of the traditional technology is represented by the expedients which are adopted for avoiding this phenomenon, and i.e.:

- a surfactant system is dosed to the stripping bath with the purpose of reducing the probability of agglomeration;
- certain concentrations of lumps in water must not be exceeded to prevent the contact between lumps from creating an aggregate (the concentration is generally lower than 10% by weight, more often equal to 5-7%);
- the concentration of solvent in the lumps must be lower than a maximum value in order to reduce the tackiness of the lumps (generally lower than 10% by weight) through the feeding of an excess of vapour.

These process conditions determine the limits of the traditional stripping technology:

- the presence of soap and disperser worsens the quality of the end-product;
- the low concentration of the slurry makes it necessary to use equipment having significant dimensions;
- the limit on the maximum concentration of solvent causes a specific consumption of vapour which cannot be optimized;
- not all the polymers (in particular SBS with a high Styrene content) can be treated with this process.

The process, object of the present invention, allows these limits to be removed: the use of a machine capable of operating with pasty polymer phase avoids the use of dispersers (improving the quality of the product), it reduces the number of apparatuses and the volumes necessary for the process (with a consequent effect on the entity of investment necessary for constructing the plant), it optimizes the vapour and electric energy consumption thus reducing the variable production costs, it widens the range of products to those degrees which, due to their behaviour, are not suitable for being produced with the "Traditional Technology".

The "Direct Devolatilization" process envisages the feeding of the polymer solution to a machine capable of supplying the process with the energy necessary for the evaporation of the solvent through heat exchange at the wall and dissipation of mechanical energy. These machines are capable of treating extremely viscous, semi-solid fluids in which the mixing system, by exploiting said viscosity of the polymer phase, is the means whereby the mechanic energy due to friction is dissipated as heat supplied to the polymer phase, which enables the evaporation of the solvent.

For this type of process, the contribution to the energy balance is provided by the heat exchange through the wall of the machine which decreases with an increase in the viscosity of the product (i.e. the lower the concentration of the residual solvent).

As the heat exchange coefficients through the walls are low, acceptable results can be obtained with small-sized machines whereas for industrial-sized machines (with a reduced surface/volume ratio) there is a substantial marginality of the contribution of the exchange at the wall.

"Direct Devolatilization" minimizes the energy necessary for the removal of the solvent by evaporation as only the vaporization energy of the solvent is supplied to the process together with a small amount of sensitive heat associated with the heating of the polymer phase. This energy however is mainly supplied to the system as dissipation of mechanical energy, i.e. as consumption of the electric energy used for the working of the motor of the mixing system of the machine.

The cost of electric energy is, with the same energy used in the process, higher than that of vapour. Starting from this consideration, it can be seen that the minimization of the energy used up in the process does not minimize the cost of the energy itself.

The scope of the present invention, described in the enclosed claims, is to provide a process for obtaining an elastomer in solid phase starting from its polymer solution which not only overcomes the drawbacks of the known art but in which the consumption of electric energy and vapour can be modulated so as to minimize the cost of the overall energy used.

The process, object of the present invention, is completely different from the "Traditional Technology". With respect to this, in fact, it eliminates the traditional stripping and finishing sections and introduces a unitary concentrated stripping operation. Furthermore, the machines used for the new process are completely different from those of the "Traditional Technology" as the strippers and open extruders disappear and machines are introduced, which operate with a closed cycle on a semi-solid polymer phase.

Furthermore, the process, object of the present invention, differs from "Direct Devolatilization" in the procedure for administering energy to the process and resulting cost difference in terms of investment and variable operating costs.

The use of vapour, a characteristic which, as illustrated hereunder, distinguishes the process, object of the present invention from "Direct Devolatilization", allows the process to be rationalized in terms of operating conditions (pressures and temperatures of the main machines) allowing the number of apparatuses necessary for the whole process to be reduced and optimizing the operating costs. In no part of scientific literature which describes the "Direct Devolatilization" process, for example the aforementioned patents, is the use of direct vapour as an energy administration means, considered. Its use, in itself innovative for this type of known process, allows functioning conditions to be defined, which are normally unpredictable and allow the same process to be improved. They avoid, for example, the vacuum condensation section of the vapours formed in the devolatilizers.

The innovative process, object of the present invention, comprises three phases:
1. a possible pre-concentration by means of a flash process of the polymer solution;
2. a first removal phase of the vapour by means of an innovative unitary "concentrated stripping" operation; and
3. a final devolatilization of the polymer.

The pre-concentration by means of a flash process comprises a first phase in which the polymer solution is concentrated through a heat exchange system followed by a flash process until the maximum viscosity is reached, compatible with the manipulation, for example through the use of pumps, piping, collection recipients, etc., of a liquid phase.

This concentration depends on the type of polymer and solvent used and should be considered a typical process parameter of the production of the particular type of polymer considered.

The exchanger uses vapour as heating fluid, condensing at a temperature (the highest possible) which ensures avoiding the degradation/regradation of the polymer.

The polymer solution thus obtained is fed to a machine capable of continuously treating the product in solid/semi-solid phase, for example in a mixing device. The evaporation of the solvent takes place in this machine (mixer). The energy necessary for the evaporation of the solvent is supplied through the introduction of water vapour. Part of the vapour condenses, yielding the energy necessary for the evaporation of the solvent to the polymer phase. The water deriving from the condensation of the vapour is present in the mixer as liquid phase.

Three distinct phases are present in the mixer: an organic phase (semi-solid composed of polymer and residual solvent), a liquid phase (composed of water and solvent) and a vapour phase (composed of water vapour and solvent).

The purpose of the mixer is to favour the exchange of heat energy of the vapour and material between the various phases through the surface renewal of the polymer phase. For this purpose, the mixer preferably consists of a container, for example substantially cylindrical, equipped with blades and counter-blades suitable for mixing the overall mass present in its interior in order to favour contact between vapour and the organic phase (polymer+solvent).

These organs contribute to pushing the polymer phase towards the discharge, remixing the polymer phase, in order to renew its surface, and moving the whole volume available inside the mixer to avoid stagnation of the polymer.

Machines which are suitable for mixing the organic phase and the vapour can be with either a vertical or horizontal axis and comprise, as movable mixing organs, both single screws and twin screws, the latter both co-rotating and counter-rotating.

The presence of the liquid phase favours the exchange of energy and material between the vapour condensing phase and the polymer phase from which the solvent evaporates, functioning as heat carrier ensuring a better homogeneity of the temperature in the evaporating mixture.

In order to maximize the positive effect deriving from the presence of free water, there is a regulation system of the water level present inside the mixer. This system can be produced in two ways depending on whether the machine has a horizontal or vertical axis.

The system generally comprises an outlet mouth, positioned at the height of the level to be maintained, equipped with a mechanical cleaning device which allows the water to be discharged preventing entrainment of the polymer. The water is collected from this outlet in a container whose top is connected to the vapour line of the mixer (in order to operate at the same pressure) and from whose bottom the water is discharged under level control.

In the case of a mixer with a horizontal axis, the main stirring system can be used for preventing the entrainment of the polymer in the water discharge by suitably positioning the outlet mouth (rear drainage).

The mixer operates under pressure control (effected on the condensation and recovery equipment, situated downstream of the mixer, connected to the vapour line). It is possible for the mixer to operate both under pressure and under vacuum. In particular, it is useful for the operating pressure to be such as to have a condensation temperature of the vapour phase (consisting of water and solvent) which allows the condensation to be effected with air-coolers or tower water coolers, avoiding the extra cost linked to the necessity of using a cooling fluid.

Depending on the process solvent present, it is generally sufficient to operate at a pressure which is slightly higher than atmospheric pressure.

When operating with cyclohexane, for example, a pressure of about 0.5 barg is sufficient for having a condensation temperature of 80° C.

After fixing the operating pressure of the mixer, its temperature will be determined by the ratio between polymer solution and vapour fed. With the same polymer solution, the increase in the vapour flow-rate will cause an increase in the temperature. The presence of the three components (water, solvent and polymer) distributed as described in the three phases (polymer phase, aqueous phase and vapour phase), on the other hand, thermodynamically determines the minimum and maximum temperatures that can be reached. The maximum temperature (extremely high vapour flow-rates) corresponds to the boiling point of the water at the operating pressure whereas the minimum temperature (low water flow-rates) corresponds to the boiling point of the solvent/water mixture at the operating pressure.

In the case of cyclohexane and water at 0.5 barg, for example, the maximum temperature is 111° C. and the minimum 80° C.

The combination of operating temperature-pressure allows the residual concentration of solvent with respect to the polymer to be determined, and therefore regulated within certain limits. In particular, the temperature/pressure combination represents a process parameter which allows the visco-elastic characteristics of the polymer phase to be varied, in particular, it allows its behaviour to be varied inside the mixer in terms of viscosity and "aggregation".

The energy necessary for the evaporation is supplied to the polymer phase for the most part by the condensation heat yielded by the direct vapour. The contribution associated with the heat exchange with the wall, by means of moving organs, is negligible. The mixer may also not be jacketed. The presence of a jacket can be useful in the start-up and decontamination phase, when operating under normal conditions, this small contribution can be avoided.

For reasons of operating costs, it is convenient for the mechanical energy supplied to the organic phase by the stirrer/screws of the mixer to be reduced to the minimum indispensable necessary for the correct functioning of the machine itself.

The factors which influence the absorption of the stirrer are:

viscosity of the polymer phase; and cohesion of the polymer phase (continuous paste or crushed granules).

As already mentioned, the viscosity of the polymer phase can be varied by modifying the operating temperature and pressure conditions of the machine (on which the concentration of solvent in the polymer phase depends).

A further advantage which derives from reducing the "apparent" viscosity of the polymer phase is due to the characteristic of this process of envisaging the presence of free water during this devolatilization phase. It has been observed that the presence of free water exerts a "lubricating" function of the system causing a reduction in the absorption of the stirrer with respect to functioning under "dry" conditions".

The cohesion of the polymer phase is determined, in addition to the aforementioned characteristics of the polymer phase (concentration of solvent and presence or absence of free water), by the configuration of the stirring/mixing/conveying system. It is known that the design of the moving parts of this type of system may or may not favour obtaining a continuous polymer phase (such as paste) or a batch phase (separated fragments/lumps more or less tacky). The process envisages functioning in both configurations, and consequently there are two distinct operating frames in terms of filling the machine, or production capacity obtainable.

It should be taken into account that the application of this type of process on multiproduct plants (for example in production plants of Styrene-Butadiene-Styrene or SBS thermoplastic elastomers) can lead to different production capacities among product categories (for example products with very different molecular weights, with or without the addition of oil).

The vapours leaving the mixer are sent to a condensation system (with air or tower water or cooling fluid). The liquid obtained (mixture of water and solvent) is collected in a specific container where the two phases are separated (aqueous and organic). The organic phase, consisting of solvent and solubility water, is sent to purification treatment (after possible storage in an intermediate collection tank). The purification treatment typically consists of an azeotropic distillation aimed at making the solvent anhydrous and eliminating the traces of heavy products entrained by the polymerization process, for example oligomers, impurities present in the starting monomers, catalytic residues, etc., avoiding their accumulation in the process.

On the basis of the geometrical characteristics of the mixer and configuration of the mixing/conveying system, the apparatus can be assimilated to one or more equilibrium steps with or without retro-mixing. In the case of more equilibrium steps, there will be a decreasing concentration profile of solvent in the polymer phase: maximum concentration near the inlet and minimum in correspondence with the discharge of the polymer. In this case, areas can be present in which the polymer phase is in the form of paste (close to the inlet) and areas in which more or less re-agglomerating granules are present (near the outlet).

The mixing/conveying system, which consists of moveable blades and fixed counter-blades, in the case of a single-screw mixer, or a twin-screw system, in the case of a co-rotating or counter-rotating twin-screw mixer, is designed so as to forcedly convey the polymer phase (paste or granules) from the inlet to the outlet allowing the flow of free water by gravity (also in an opposite direction with respect to the movement of the polymer).

At the outlet of the mixer, the discharge system of the polymer phase also consists of a conveying system, twin-screw or single screw, in turn fed by the main conveying system. The discharge system is designed so as to give a certain compression degree to the product (which causes its re-agglomeration when there is the presence of lumps) generating a pressure which is such as to allow it to be discharged towards a second machine through a regulation valve. This valve operates subject to pressure control. The pressure, upstream of the same valve, generates its opening, when a minimum pressure threshold is not reached (still greater than the operating pressure of both machines) the valve is closed. This enables the first and second machine to operate at different pressures. During the discharging of the product, the product itself is the sealing element between the two machines.

The functioning principle of the mixer is similar to that of the first stripper of a traditional stripping plant of polymer solution with the difference that the use of a mixer capable of operating with pasty polymer phase avoids the use of dispersers, it reduces the volumes necessary for the process, it optimizes the vapour consumption.

The polymer phase coming from the mixer contains a concentration of solvent, which depends on the operating conditions defined for the different types of polymer and indicatively ranges from 5 to 30% by weight, and a quantity of water (insoluble but dispersed in the polymer phase) ranging from 1 to 10%.

The polymer phase thus formulated is fed to at least a second machine in order to remove, by evaporation, the residual solvent and humidity present. This operation is carried out in one or more machines in series operating with a closed circuit. In this phase, the energy necessary for the evaporation is partly supplied to the system through the dissipation of mechanical energy and partly by the introduction of vapour.

The machines are run at different pressure levels in order to reach the desired humidity specification and residual solvent on the end-product. The machine generally operates under vacuum in order to favour the removal of water and solvent from the polymer.

The vapour phase which is generated is removed from the machine by means of specific degassing and is recycled to the process.

The vapours thus obtained are recompressed in a vapour ejector and fed to the mixer. This expedient allows to:
- exploiting the capacity of these vapours of removing further solvent (the partial pressure of the solvent in these streams is lower than the ratio between the solvent and water vapour pressures);
- avoiding the necessity of a specific empty cycle;
- avoiding a specific condensation section for these vapours (which are at low pressure and would require the use of cooling fluid);

The machines used for this section can be degassing extruders or List-type mixers.

The temperature control is activated through:
- a rev regulation system of the extruder (which influences the energy supplied to the polymer);
- introduction of water, if necessary, into certain points of the extruder, in order to lubricate the system (reducing effect of the apparent viscosity of the polymer) and cool (by evaporation) the polymer phase.

The process for obtaining an elastomer in solid phase starting from its polymer solution, object of the present invention, can be better understood with reference to the drawing of the enclosed FIG. 1 which describes an illustrative and non-limiting embodiment.

According to the scheme shown in the Figure, the polymer solution is fed, together with fresh (2) and recycled (20) water vapour, through (1) to a mixing vessel (4), consisting for example of a cylinder inside which there is a screw mixing system (not illustrated). The polymer solution, for example polybutadiene in cyclohexane, can come directly from the production plant or from a pre-concentration step, by means of a flash process, not represented in the Figure.

The polymer solution and water vapour are kept in close contact inside the mixer (4) to favour the heat exchange between the vapour phase, which condenses, and the solvent which evaporates. There is consequently no heat transfer (substantially by friction) from the moving parts to the polymer solution, inside the mixer (4).

Whereas the moveable elements present inside the mixer favour contact between water vapour and solution, they also push the mass essentially consisting of polymer solution, which becomes concentrated, and condensed water, towards the outlet, where there is a discharge device (5). The latter is a generic screw system which pushes the concentrated polymer solution, which also entrains part of the condensed water dispersed in the polymer, towards the second devolatilization system (6).

The valve (21) operates subject to a pressure control situated upstream of the same, so that the increase in pressure, generated by the presence of polymer pushed by the discharge system (5), causes the opening of the valve allowing the mixer (4) and devolatilizer (6) to operate at independent pressures (using the same polymer phase as sealing element).

The devolatilizer (6) is an extruder-type device comprising a cylindrical body and a screw stirring system which transfers the mechanical rotation energy to the polymer mass in the form of heat due to friction. The devolatilizing effect of the friction heat can be assisted by condensation heat supplied by water vapour fed to the extruder (6) through a plurality of inlets, two of these (14) and (15) are illustrated in the Figure.

The streams consisting of non-condensed water vapour, in excess, and solvent vapours are discharged by means of vents (7), joined in a single stream (20) which is recycled, after recompression in the ejector (3) by means of fresh vapour (2), to the mixing device (4).

The polymer, substantially free of solvent, and condensation water, a residue of the treatment in (4) and (6), are discharged, through (16), from the outlet of the extruder (6).

According to the scheme of the Figure, the aqueous phase condensed in (4), consisting of a mixture of water and solvent, is discharged by means of extraction (10) and collected in the tank (17). The position of the discharge mouth of the aqueous phase determines the level of liquid to be maintained inside the mixer (4).

In the same way, the vapours produced during the mixing in (4), essentially consisting of solvent vapours and non-condensed water vapour, are discharged through (11) and the valve (18). The latter serves to maintain a pressure difference between the mixer (4) and tank (17) which is such as to guarantee the discharge of the aqueous phase from (10).

The solvent and water vapours, coming from both the mixer (4) and collection tank (17), are condensed in (8).

The overall aqueous phase, coming from both the condenser (8) and tank (17), is fed to the decanter (9) from which a stream of water (13) and a stream of solvent (12) are recovered and sent to treatment, not illustrated.

The invention claimed is:

1. A process for obtaining an elastomer in solid phase from its polymer solution comprising:
    a. pre-concentrating the polymer solution coming from the production system by a flash process;
    b. subjecting the pre-concentrated polymer solution to concentrated stripping by water vapour in a mixing device comprising internal moveable mixing parts which transfer a minimal amount of mechanical energy to the solution in the form of friction heat; and
    c. subjecting the concentrated polymer phase coming from step (b) to devolatilization of the residual solvent in at least one device comprising internal moveable parts, where the devolatilization heat is provided both by the mechanical energy of said moveable parts transferred to the concentrated polymer solution in the form of friction heat, and by introduction of vapour flow.

2. The process according to claim 1, wherein the polymer solution consists of an elastomer selected from polybutadiene, polyisoprene and styrene(S)-butadiene(B) SB, SBS, and SBSB elastomers having random, block or tapered distribution, and all of the aforementioned products wherein the olefinic part has been completely or partially hydrogenated, and an apolar solvent selected from pentane, cyclopentane, hexane, and cyclohexane.

3. The process according to claim 1 or 2, wherein the pre-concentration step is effected through a heat exchange system followed by a flash process.

4. The process according to claim 1 or 2, wherein the concentrated stripping temperature inside the mixing device is within the range of 60 to 120° C.

5. The process according to claim 1 or 2, wherein the aqueous phase obtained from condensing the water vapour in the concentrated stripping step is partially discharged externally and partially transferred, together with the concentrated polymer solution, to the devolatilization step (c).

6. The process according to claim 5, wherein the solvent content in the concentrated solution supplied to the devolatilization step is within the range of 5 to 30% by weight whereas the entrained water is within the range of 1 to 10% by weight.

7. The process according to claim 1 or 2, wherein the vapour flows supplied to the devolatilization step are two.

8. The process according to claim 1 or 2, wherein the excess vapours from the devolatilization step are recycled to the concentrated stripping step.

9. The process according to claim 1 or 2, wherein the pressure in the mixing device of the concentrated stripping step is maintained higher than that of the device comprising internal moveable parts of the devolatilization step.

10. The process according to claim 1 or 2, wherein the device comprising internal moveable parts, of the devolatilization step, is an extruder.

11. A process for obtaining an elastomer in solid phase from its polymer solution comprising:
   a. subjecting the polymer solution to concentrated stripping by water vapour in a mixing device comprising internal moveable mixing parts which transfer a minimal amount of mechanical energy to the solution in the form of friction heat; and
   b. subjecting the concentrated polymer phase coming from step (b) to devolatilization of the residual solvent in at least one device comprising internal moveable parts, where the devolatilization heat is provided both by the mechanical energy of said moveable parts transferred to the concentrated polymer solution in the form of friction heat, and by introduction of vapour flow.

12. The process according to claim 11, wherein the polymer solution consists of an elastomer selected from polybutadiene, polyisoprene and styrene(S)-butadiene(B) SB, SBS, and SBSB elastomers having random, block or tapered distribution, and all of the aforementioned products wherein the olefinic part has been completely or partially hydrogenated, and an apolar solvent selected from pentane, cyclopentane, hexane, and cyclohexane.

13. The process according to claim 11, wherein the concentrated stripping temperature inside the mixing device is within the range of 60 to 120° C.

14. The process according to claim 11, wherein the aqueous phase obtained from condensing the water vapour in the concentrated stripping step is partially discharged externally and partially transferred, together with the concentrated polymer solution, to the devolatilization step (b).

15. The process according to claim 14, wherein the solvent content in the concentrated solution supplied to the devolatilization step is within the range of 5 to 30% by weight whereas the entrained water is within the range of 1 to 10% by weight.

16. The process according to claim 11, wherein the vapour flows supplied to the devolatilization step are two.

17. The process according to claim 11, wherein the excess vapours from the devolatilization step are recycled to the concentrated stripping step.

18. The process according to claim 11, wherein the pressure in the mixing device of the concentrated stripping step is maintained higher than that of the device comprising internal moveable parts of the devolatilization step.

19. The process according to claim 11, wherein the device comprising internal moveable parts, of the devolatilization step, is an extruder.

* * * * *